United States Patent [19]
Kluver

[11] Patent Number: 5,388,504
[45] Date of Patent: Feb. 14, 1995

[54] TWINE WRAP CONTROL FOR ROUND BALER

[75] Inventor: Leroy M. Kluver, Celina, Ohio

[73] Assignee: AGCO Corporation, Norcross, Ga.

[21] Appl. No.: 110,004

[22] Filed: Aug. 23, 1993

[51] Int. Cl.$^6$ .................... B65B 63/04; B65B 57/10
[52] U.S. Cl. ............................................ 100/4; 53/52;
53/118; 53/507; 53/587; 56/341; 100/5; 100/13
[58] Field of Search .............. 100/4, 5, 13, 88;
53/118, 507, 587, 52; 56/341

[56] References Cited

U.S. PATENT DOCUMENTS

| | | | |
|---|---|---|---|
| 4,009,653 | 3/1977 | Sacht | 100/88 |
| 4,024,804 | 5/1977 | Hanson | 56/341 X |
| 4,224,867 | 9/1980 | Gaeddert et al. | 100/88 |
| 4,319,446 | 3/1982 | Arnold et al. | 56/341 |
| 4,354,429 | 10/1982 | Boldenow et al. | 100/5 |
| 4,375,187 | 3/1983 | Kluver et al. | 100/88 |
| 4,389,929 | 6/1983 | Kluver et al. | 100/88 |
| 4,389,930 | 6/1983 | Rutschilling | 100/88 |
| 4,402,176 | 9/1983 | Arnold et al. | 56/341 |
| 4,454,707 | 6/1984 | Ronayne et al. | 56/341 |
| 4,483,247 | 11/1984 | Coeffic | 100/88 |
| 4,497,163 | 2/1985 | Ogman | 56/341 |
| 4,517,795 | 5/1985 | Meiers | 56/341 |
| 4,542,617 | 9/1985 | Sonntag | 56/341 |
| 4,549,481 | 10/1985 | Groeneveld et al. | 100/98 R |
| 4,563,854 | 1/1986 | Ackermann et al. | 53/118 |
| 4,569,439 | 2/1986 | Freye et al. | 53/118 X |
| 4,602,560 | 7/1986 | Jacky | 100/3 |
| 4,624,179 | 11/1986 | Yves et al. | 100/4 |
| 4,656,931 | 4/1987 | Van Den Bossche et al. | 100/4 |
| 4,674,403 | 6/1987 | Bryant et al. | 100/4 |
| 4,697,402 | 10/1987 | Anstey et al. | 53/506 |
| 4,796,524 | 1/1989 | Renaud | 100/3 |
| 4,855,924 | 8/1989 | Strosser et al. | 100/5 X |
| 4,924,405 | 5/1990 | Strosser et al. | 364/468 |
| 4,998,961 | 3/1991 | Anderson et al. | 100/4 |
| 5,152,123 | 10/1992 | Viaud et al. | 53/508 |
| 5,215,005 | 6/1993 | Schlotterbeck et al. | 100/5 |

FOREIGN PATENT DOCUMENTS

| | | | |
|---|---|---|---|
| 3640696 | 6/1988 | Germany | 100/4 |
| 4116619 | 11/1992 | Germany | 100/4 |
| 2153293 | 8/1985 | United Kingdom . | |

Primary Examiner—Stephen F. Gerrity
Attorney, Agent, or Firm—Biebel & French

[57] ABSTRACT

An automatic control device for controlling the placement of wrap material on a bale within a round baler. A pair of twine guide tubes are actuated for movement by an actuator which is energized by a controller for controlling a twine wrapping operation. Separate twine strands are fed to each of the twine guide tubes and the quantity of twine fed through the guide tubes is monitored by sensor pulleys which send a pulsed signal to the controller. The controller controls the location of the twine guide tubes in response to the sensed signal from the sensing pulleys whereby a predetermined quantity of twine is placed at predetermined locations along the bale.

15 Claims, 4 Drawing Sheets

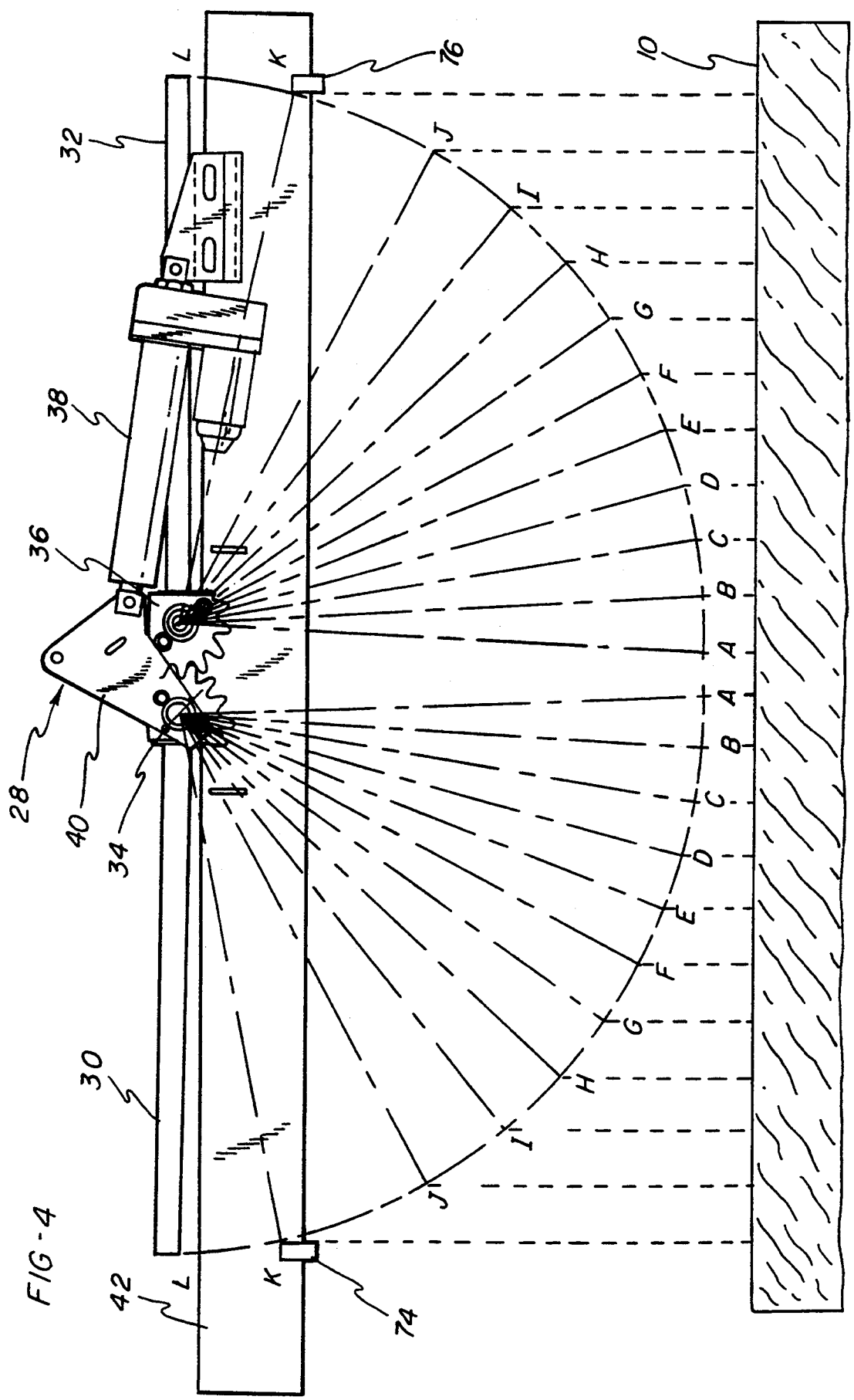

TWINE WRAP CONTROL FOR ROUND BALER

BACKGROUND OF THE INVENTION

The present invention relates to a baling apparatus and method for wrapping round bales with twine and, more particularly, to a baling apparatus and method for controlling the distribution of twine onto a round bale in response to the measured quantity of twine being dispensed, and in response to operator selected parameters for the operation of the baler.

For many years agricultural practices have included baling of forage crops such as hay and alfalfa with the objective of preserving these crops to feed livestock when needed, such as during the winter or other non-growing season or when adequate grazing resources are not otherwise available. One common method of preserving forage crops is to form the forage crop into bales which can be easily stored. Included are bales which are typically rectangularly shaped and sized such that an individual can stack and move these hay bales a short distance to a barn or their storage area. Also included are round bales which can be better suited than rectangular bales for specific needs of agriculture and livestock feeding.

Round baling has gained wide acceptance in many facets of agriculture and livestock handling for gathering and storing forage crops. Round balers are generally pulled by a tractor through a field of cut forage crop, such as hay or alfalfa, which is then introduced into the round baler through a passageway or throat leading to a cylindrical chamber. Belts or rollers are utilized within the chamber to form and tumble the forage material into a large cylindrical, or round, bale of forage crop. In addition, it is well known to tie or wrap the bale in the field with twine or netting to preserve the densely packed outer shell and to maintain the bale in its cylindrical shape. Because these bales usually are quite large, often approaching six feet in diameter and 2,000 pounds in weight, systems have been developed for automatically wrapping the bale with twine or netting while the bale rotates within the baler. Automatic mechanisms have evolved which are intended to minimize the time and effort necessary to wrap a bale.

Automatic twine tying machines use rolls of twine fed into the baling chamber by various cooperating feed arms that deploy the twine in a desired wrapping pattern. Other automatic wrapping mechanisms wrap the bale with polymeric sheeting or netting fed into the baler from a large roll of sheeting or netting that is unwound, fed into the baling chamber and wrapped around the bale as the formed bale is rotated within the baler. Some roll wrapping systems are less than fully desirable because of their expense or somewhat complicated mechanisms, some of which are not particularly well suited to use on fixed chamber round balers. Further, previous roll wrapping mechanisms have been difficult to adjust for achieving desired performance characteristics.

In addition, prior art twine tying machines which incorporate programmable controllers for controlling the distribution of the twine to particular locations on the bale have proven difficult for operators to program without first gaining experience in the operation of the machine. Specifically, prior art controllers for twine tying machines have typically included a teaching mode of operation wherein the operator manually manipulates the operation of the machine in real time. In this manner, a program is simultaneously produced and input into the controller wherein the program consists of time controlled manipulation of guide tubes for distributing twine onto the bale. This method of programming a controller can prove to be difficult until the operator obtains a certain level of skill for properly manipulating the twine guide tubes to move to particular locations on the bale at particular times in the wrapping operation. In addition, such a wrapping operation is typically designed to operate at a predetermined operating speed for the baler such that the twine distribution on the bale may vary depending on variations in the speed of the baler.

Accordingly, there is a need for a twine wrap control for a round baler wherein the control of the twine guide for guiding twine onto the bale operates independently of the speed of the baler. Further, there is a need for such a twine control wherein a controller may be programmed to provide a desired wrap pattern on a bale independently of the time required to wrap the bale.

SUMMARY OF THE INVENTION

The bale wrapping of the present invention overcomes the problems of the prior art and provides a bale wrapping apparatus and method which is especially suitable for use in round balers that utilize a plurality of forming belts and drive rollers disposed about a chamber for forming and rotating forage crop into a cylindrical bale.

The bale wrapping apparatus includes a twine tube assembly for guiding twine onto a bale formed in the chamber, twine feed sensors for monitoring the quantity of twine fed onto the bale and a controller for receiving a signal from the twine feed sensors and for controlling a predetermined sequence of operations for wrapping the bale.

The twine tube assembly preferably includes a pair of guide tubes mounted for rotational movement and an actuator for locating ends of the tubes at a plurality of predetermined positions whereby the twine is guided into contact with the bale at different locations along the longitudinal axis of the bale. The ends of the tubes dwell at the different predetermined positions for a duration corresponding to the amount of time required for a predetermined measured amount of twine to be fed from the tubes at each locations such that a regulated amount of twine is applied at specific locations along the width of the bale.

The twine is applied in spiral wraps and the amount of twine applied to the bale is controlled by the operator selecting a desired spacing between adjacent wraps of the twine. In this manner, the amount of twine applied and the spacing between adjacent wraps may be controlled depending on the type of crop being wrapped as well as other factors such as the distance and the frequency that the bale will be transported.

It is therefore a general object of the present invention to provide an improved bale wrapping apparatus and method for wrapping twine around a bale within a baler.

It is a further object of the present invention to provide a bale wrapping apparatus and method wherein a measured amount of twine is applied to predetermined locations along a round bale.

It is yet another object of the present invention to provide a bale wrapping apparatus and method including a controller for controlling the placement of twine being wrapped around a bale wherein the controller may be programmed by an operator to provide the twine at a desired wrap spacing on the bale.

Other objects and advantages of the invention will be apparent from the following description, the accompanying drawings and the appended claims.

BRIEF DESCRIPTION OF THE DRAWINGS

FIG. 4 is a view similar to FIG. 3 wherein the twine guide tubes are located in a final position.

DETAILED DESCRIPTION OF THE PREFERRED EMBODIMENT

Figure 1:
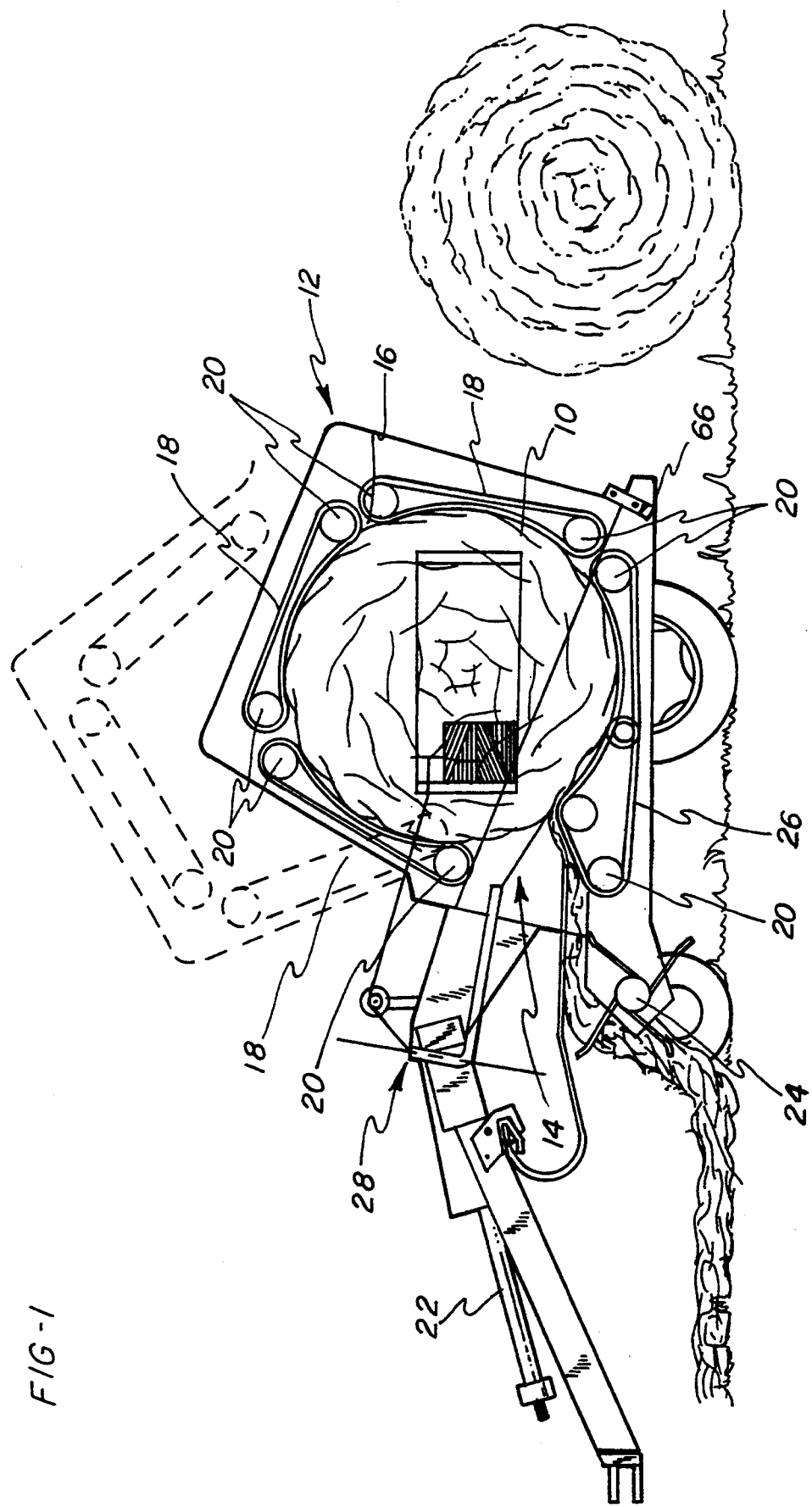
FIG. 1 is a diagrammatic side view in section of a baler constructed in accordance with the present invention.

Referring to FIG. 1, the present invention provides an apparatus and method for distributing twine onto a bale 10 located within a round baler 12. The baler 12 is illustrated as a fixed chamber round baler which may be constructed and operated in accordance with the round baler described in U.S. application Ser. No. 08/053,914 assigned to the assignee of the present application, and incorporated herein by reference. It should be understood that although the present invention is described in terms of a fixed chamber round baler, the present invention is not intended to be limited to the specific baler structure described herein, and the invention may be practiced with other balers, for example, in a variable chamber round baler.

Generally, the baler 12 includes an open throat 14 for introducing cut forage crops into the fixed substantially cylindrical round baling chamber 16. A plurality of endless forming belts 18 are positioned adjacent to one another and are located tangentially about the chamber 16 for receiving the cut forage crops as they pass through the throat 14. The forming belts 18 ride on rollers 20 which are driven by a conventional chain and sprocket drive mechanism located within the baler. The drive mechanism is driven by a conventional power source such as a power take off shaft 22 for connection to a tractor or other powered vehicle.

The baler 12 includes a two-part clamshell housing which may be opened, as illustrated in phantom lines, to permit the formed bale 10 to pass out of the baler 12. In addition, a pick-up mechanism 24 is provided for feeding cut forage crops into the open throat 14, and bottom belts 26 move the crop rearwardly, while the remaining belts 18 lift and tumble the material to the center of the baling chamber 16.

Figure 2:
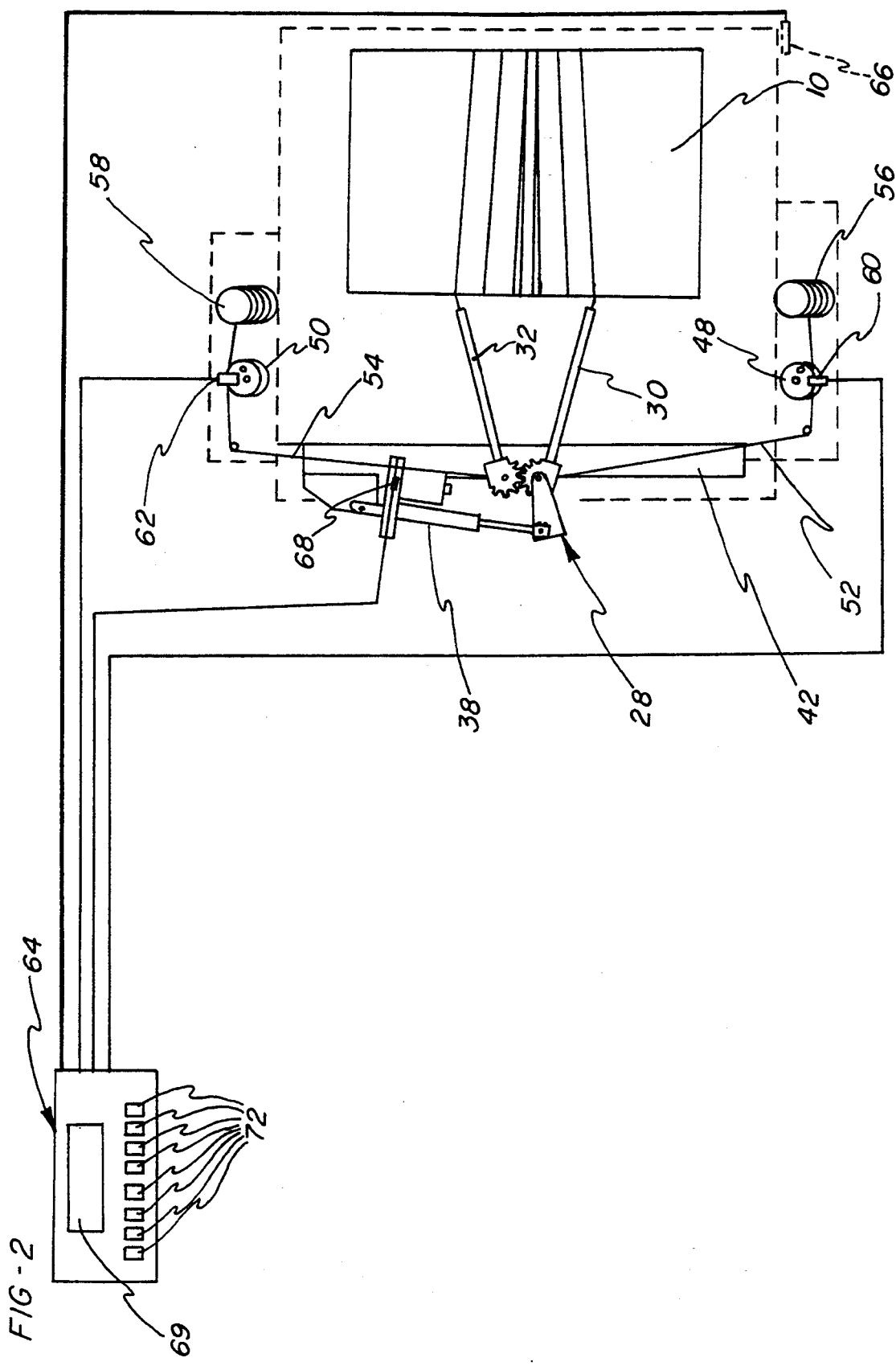
FIG. 2 is a diagrammatic view from above of the baler of FIG. 1.
Figure 3:
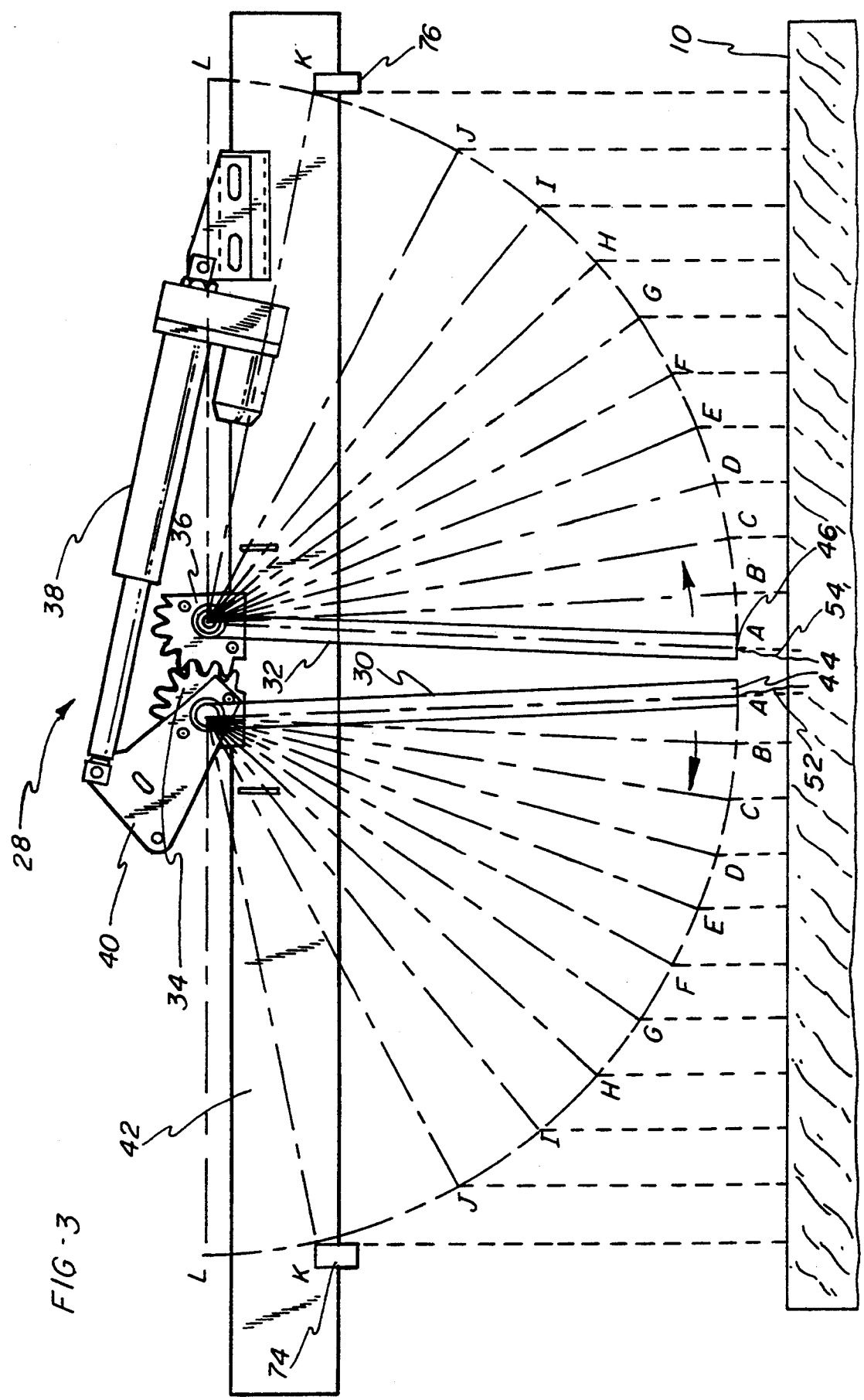
FIG. 3 is a diagrammatic view from above of the twine guide tubes in an initial position.

As is further illustrated in FIGS. 2-4, a twine tube assembly 28 is provided mounted to a front frame assembly 42 of the baler 12 for placing the ends of twine strands adjacent to the nip area or pinch point between the formed bale 10 and the bottom belts 26. The twine tube assembly 28 is of conventional construction and includes first and second twine tubes 30, 32 which are attached to respective spur gears 34, 36 for rotational movement. An actuator 38 is mounted to the front frame assembly 42 and is connected to the spur gear 34 through a pivot plate assembly 40 whereby movement of the pivot plate assembly 40 by the actuator 38 causes simultaneous movement of the first and second twine tubes 30, 32. The actuator 38 is adapted to move the twine tubes 30, 32 in rotational movement such that respective outlet ends 44, 46 for the tubes 30, 32 may be positioned at a plurality of distinct positions, labeled A-L.

As is shown in FIG. 2, first and second twine measurement sensor wheels or pulleys 48, 50 are provided for measuring the amount of twine strands 52, 54 being fed along a twine path from respective twine supply rolls 56, 58 to the guide tubes 30, 32. The sensor pulleys 48, 50 include sensors 60, 62, such as magnetic reed switches, for monitoring the rotation of the wheels 48, 50. Signals from the sensors 60, 62 are transmitted to a controller 64 for controlling a twine wrapping operation for the baler 12. In addition, a sensor 66 is also provided for sensing when a bale within the chamber 16 is complete in order to initiate a wrapping operation. In the embodiment illustrated, the sensor 66 may be similar to the sensor described in U.S. Pat. No. 4,389,929, incorporated herein by reference, wherein the sensor is a switch for sensing when the two halves of the clamshell forming the chamber are forced apart slightly, thereby indicating that the chamber has a completely formed bale.

An additional sensor in the form of a potentiometer 68 is provided connected to the actuator 38 for sensing the percentage of extension of the actuator 38 and for providing a corresponding signal to the controller 64.

The controller 64 may be a conventional programmable controller and preferably includes a visual display panel 69 for providing the operator with information on the twine wrapping operation, such as the twine spacing and number of wraps applied to the bale 10, as well as information relating to the set-up parameters for the wrapping operation. In addition, mode selection keys and parameter selection and programming keys 72 are provided for use by an operator in selecting and programming a particular wrapping cycle.

In a typical wrapping operation, the controller 64 will receive a signal from the sensor 66 indicating that the bale 10 being formed in the chamber 16 is complete such that a wrapping cycle may be performed. The wrapping cycle may be initiated automatically by the controller 64 or an operator may push a designated one of the keys 72 for initiating the wrapping of the bale 10. At the initiation of the wrapping cycle, the twine tubes 30, 32 move to the position A shown in FIG. 3 wherein the ends 44, 46 of the tubes 30, 32 are located adjacent to the center of the bale 10. The movement of the tubes 30, 32 to the position A is preferably controlled as a timed operation wherein the actuator 38 is energized for preset time period sufficient to ensure that the tubes move to the initial position A.

The twine tubes 30, 32 will dwell at the initial position A until the twine strands 52, 54 extending from the ends 44, 46 thereof become caught in the nip between the bale 10 and the lower belt 26 and extend around the bale 10 a predetermined number of times, as determined by the sensors 60, 62. Pulses are produced at the sensors 60, 62 each time the respective sensor pulleys 48, 50 make a revolution. Thus, by knowing the circumference of the sensor pulleys 48, 50 and the circumference of a completed bale contained within the chamber 16 of the baler 12, it is possible for the controller 64 to calculate the number of pulses from the sensors 60, 62 required to provide sufficient twine for providing the desired number of wraps around the bale 10 at the center of the bale 10. Therefore, the center wrap twine signal count, or number of pulses sent to the controller 64 by the sensors 60, 62 to provide a desired number of wraps is equal to $\pi DN/K$ wherein D is the diameter of the bale 10, N is the number of wraps desired to be placed at the center of the bale 10 and K is the effective circumference of the twine movement sensor pulleys 48, 50.

It should be noted that the controller 64 does not begin to count the pulses from the sensors 60, 62 until both of the lengths of twine 52, 54 have become caught between the lower belt 26 and the bale 10. In other words, both of the sensors 60, 62 must be sending a pulse signal to the controller 64 before the wrapping cycle can proceed. Once both of the sensors 60, 62 are providing a signal to the controller 64, the controller will control the wrapping operation based on the signal received from the sensor 60 or 62 associated with the last length of twine 52, 54 to begin feeding onto the bale 10, which sensor will hereinafter be referred to as the count sensor 60 or 62. However, the controller 64 will continue to monitor the pulses from both sensors 60, 62 to ensure that neither twine supply roll 56, 58 has been depleted and that neither of the lengths of twine 52, 54 have broken, as would be indicated by the pulses produced by the sensors 60, 62 terminating.

Once the predetermined number of pulses have been sensed for providing the desired number of wraps at the center of the bale 10, the actuator 38 will be energized to move the twine tube ends 44, 46 to the next position B where the twine tubes 30, 32 will dwell for another predetermined number of counts from the count sensor 60 or 62 being monitored by the controller 64. In a typical wrapping operation, the twine tubes 30, 32 will dwell at each of the predetermined positions B-K for an equal number of sensor counts to provide an even distribution of twine across the width of the bale 10.

It should be noted that, in the present embodiment, the twine tube positions A-K are selected to be at ten equally spaced locations in a direction parallel to the longitudinal axis of the bale 10 such that the movement of the actuator 38 will not be linear but will increase as the twine tube ends 44, 46 move in the direction from their initial positions to the final positions for wrapping the ends of the bale 10. The actuator 38 is controlled such that it will move the tubes 30, 32 at full speed from one position to the next position such that the full torque of a motor powering the actuator 38 is available for causing movement of the twine tubes 30, 32 to each position.

In order to obtain a desired spacing between adjacent wraps on the bale 10, the controller 64 causes the actuator 38 to be energized to move the twine tubes 30, 32 from one twine tube position to the next position when a predetermined number of pulses from the count sensor 60 or 62 is received in accordance with the equation $\pi DC/KS$ wherein D is the diameter of the bale 10, C is the traverse distance between adjacent ones of the predetermined locations, K is the effective circumference of the sensor pulleys 48, 50 and S is the desired spacing between the adjacent wraps of twine from the end of one wrap to the beginning of the next wrap. Thus, by selecting a particular wrap spacing S, the number of sensor pulses counted for dwelling at each of the predetermined locations before moving to the next adjacent location will also be selected through the above described equation to result in the desired wrap configuration on the bale 10.

For example, if the diameter D of the completed bale is 48 inches, the pulley circumference K is 8.54 inches and the traverse distance C is one tenth of the total bale width traversed by each of the twine tubes 30, 32 or 2.4 inches, the number of pulses counted between each actuation of the tubes 30, 32 will be 42.38/S. Thus, if a wrap spacing S of 2 inches is desired, the twine tubes 30, 32 will dwell at each position for a count of 21 sensor pulses. Similarly, if a wrap spacing S of 5 inches is desired, the tubes 30, 32 will dwell at each position for 8 sensor pulses. In this manner, the spacing between adjacent wraps is controlled by varying the dwell time of the tubes 30, 32, and thus the amount of twine dispensed, at each of the predetermined locations B-K.

It should also be noted that the spacing between wraps of twine on the bale 10 is a particularly desirable parameter for the operator to select in that the wrap spacing is selected depending on the particular crop being baled and depending on the frequency and distance that the bale 10 will have to been transported. For example, for a baling operation performed on a crop which is particularly loose or fine, a closer twine spacing will be desired. In the same manner, if the crop is intended to be transported frequently or over large distances, such that the bale 10 has greater potential for being shaken or loosened, a close twine spacing would also be desirable. Alternatively, for crops which have a natural tendency to remain in the shape of the bale 10 into which they are formed, and for bales which will undergo a minimum of transportation, it is desirable to use a wider twine spacing to thereby conserve twine.

When the twine tubes 30, 32 have been moved to the final predetermined location K, it is desirable to allow the tubes 30, 32 to dwell at this final position to provide multiple wraps around the bale 10 in order to ensure that the twine does not become unraveled. The placement of the twine at the location K is performed based on the number of pulses provided by the count sensor 60 or 62 corresponding to the desired number of wraps chosen by the operator. Subsequently, the twine tubes 30, 32 are moved to the location L, as illustrated in FIG. 4, where they engage a conventional twine cutting mechanism (not shown), which mechanism operates to clamp the twine in engagement with a cutter blade in response to movement of the twine tubes 30, 32 into engagement with the mechanism, and the tension applied by the bale 10 as it pulls on the twine will cause the twine to be severed by the cutter blade. The movement of the tubes 30, 32 from the position K to the position L is preferably a time controlled operation wherein the actuator 38 is energized for a predetermined period of time, which may be selected by the operator, to ensure that the tubes 30, 32 fully move into engagement with the cutting mechanism. In addition, twine guides 74, 76 are provided at opposing ends of the frame assembly 42 for maintaining the twine in alignment with the position K on the bale as the twine tubes 30, 32 move to the cut-off position L.

It should be noted that the controller 64 may be preprogrammed with a preselected series of steps to control the actuator 38 to position the actuator arms at specific predetermined locations for different baler models since the percentage of actuator extension required for different baler models will vary. Thus, an operator may select a predetermined program, such as may be provided in a preprogrammed look-up table, to start a baling operation without requiring extensive instruction relating to control of the wrapping operation. In addition to selecting a predetermined program related to a particular baler model, the operator may also select the wrap spacing whereby the number of pulses generated by the count sensor 60 or 62 at each predetermined location may be operator selected in order to obtain a desired wrap pattern.

Further, the controller input keys may also be used by the operator to input a unique program for controlling the actuator 38. For example, the operator may designate different actuator extension positions, as well as the particular number of sensor pulses to be counted at each position. It should also be noted that it is not necessary for the twine tubes 30, 32 to move in only one direction during a wrapping cycle and that in some instances it may be desirable to have the twine tubes 30, 32 move back toward the center of the bale 10 during a portion of the wrapping cycle. For example, it may be desirable for the twine tubes to move back and forth across the width of the bale 10 in order to wrap the twine over the loose ends of the twine adjacent to the center of the bale 10 in order to lock in the starting tails of the twine strands.

Also, it should be noted that the above-described stop positions for the twine tubes 30, 32, wherein the positions are equally spaced across the bale 10, is only one example of the operation of the present invention. For example, it is within the scope of the invention to alter the programming of the controller 64 such that an unequal or varying spacing is provided between the predetermined positions for the twine tubes 30, 32.

From the above description, it should be apparent that the present invention provides a method and apparatus for controlling the placement of twine onto a bale 10 wherein signals from sensors provide feedback to a controller indicating where on the bale 10 twine is being placed as well as how much twine is being used in order to provide a complete definition of the twine wrap process. Further, by using a sensor for each of the twine feed paths, it is possible for the controller to alert an operator that only one of the two twine strands have started to feed. It also allows for the control of the twine wrap process based on the monitoring of the last of the two twine strands to start to wrap the bale 10. It further permits the controller to alert the operator to the condition that one of the twine strands has stopped feeding during a twine wrap cycle, such as when twine is depleted on one side or when a tangle causes the twine to tear on one side, whereby ejection of a partially wrapped bale 10 from the baler may be prevented. In addition, the feedback signals can be used to indicate a malfunction condition resulting from the twine not properly cutting off on one side at the end of a cycle, as may be indicated by the number of pulses sent to the controller from one of the pulley sensors 60, 62 exceeding a predetermined limit during the cut off stage of the cycle.

Finally, it should be noted that the present controller may also be programmed to control a net wrapping operation and that an operator may select the particular mode of operation for the particular type of wrapping material as well as select a program corresponding to the model of baler being used. For example, it is contemplated that the present controller may also be programmed to control the net wrapping cycle described in the above referenced U.S. application Ser. No. 08/053,914.

Thus, the present invention provides a unique control system for monitoring a bale wrapping cycle. In particular, the present invention provides a unique method and apparatus whereby the quantity of wrapping material is monitored to minimize the amount of waste which has previously occurred in other bale wrapping systems as a result of controlling the wrapping operations on a time dependant basis wherein variations of the driving speed for the input shaft of the baler may cause variations in the amount of wrap applied. By monitoring the quantity of wrap material applied to the bale throughout the wrap cycle, it is possible to provide the precise quantity of wrap material desired on the bale, and it is possible through monitoring of the twine guide tubes location to precisely control and monitor the quantity of wrap material applied to particular locations on the bale.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An apparatus for forming and wrapping bales, said apparatus comprising:
    a chamber for receiving crop material to form a bale,
    wrap guide means for guiding wrap material onto a bale in said chamber,
    monitoring means for monitoring the distribution of said wrap material onto said bale,
    control means for controlling the position of said wrap guide means in response to the monitored distribution of said wrap material, and
    wherein said monitoring means comprises sensing means for measuring the quantity of wrap material as it is dispensed onto said bale.

2. The apparatus as in claim 1 wherein said wrap guide means is positionable to a plurality of discrete predetermined positions along said bale.

3. The apparatus as in claim 2 wherein said wrap guide means dwells at each of said discrete positions while a predetermined quantity of material is distributed onto said bale.

4. The apparatus as in claim 1 wherein said wrap guide means is movable from a first position to a second position on said bale and said control means is programmable to wrap a bale with an operator selected quantity of material from said first to said second position.

5. The apparatus as in claim 4 wherein said wrap material is twine for wrapping a round bale and said operator selected quantity of material corresponds to a twine spacing between wraps selected by an operator.

6. The apparatus as in claim 1 wherein said control means positions said wrap guide means at different positions along said bale in response to the measured quantity of wrap material dispensed.

7. An apparatus for forming and wrapping round bales with twine, said apparatus comprising:
    a chamber for receiving crop material to form a bale,
    a twine tube assembly for guiding twine onto a bale in said chamber,
    a twine feed sensor for monitoring the quantity of twine as it is fed onto said bale, and
    a controller for receiving a signal from said twine feed sensor and for controlling a predetermined sequence of operations for wrapping said bale in response to said signal.

8. The apparatus as in claim 7 wherein said twine tube assembly is mounted for rotational movement and includes an actuator for locating an end of said tube assembly at a plurality of predetermined positions whereby said twine is guided into contact with said bale at different locations along a longitudinal axis of said bale.

9. The apparatus as in claim 8 wherein said actuator causes said tube assembly to dwell at each of said predetermined positions to permit a measured quantity of said twine to be dispensed at each of said predetermined positions.

10. The apparatus as in claim 9 wherein said measured quantity of twine is dispensed independently of a rotational speed for said bale within said chamber.

11. The apparatus as in claim 7 wherein said twine feed sensor comprises a twine sensor wheel and a sensor for sensing the number of rotations of said wheel.

12. The apparatus as in claim 7 wherein said twine tube assembly guides said twine from an initial position to an end position on said bale and said controller includes means for an operator to select the spacing between adjacent wraps of twine applied to said bale as said twine is applied to said bale from said initial position to said end position.

13. The apparatus as in claim 7 wherein said controller includes an indicator panel for indicating to an operator the number of wraps applied to said bale in response to said signal from said twine feed sensor.

14. The apparatus as in claim 7 wherein said controller includes an indicator panel for indicating to an operator the twine spacing between wraps applied to said bale.

15. The apparatus as in claim 7 wherein said twine tube assembly comprises two twine tubes mounted for pivotal movement to feed two strands of twine, said twine tubes being connected to each other for simultaneous movement.

* * * * *